Figure 1:
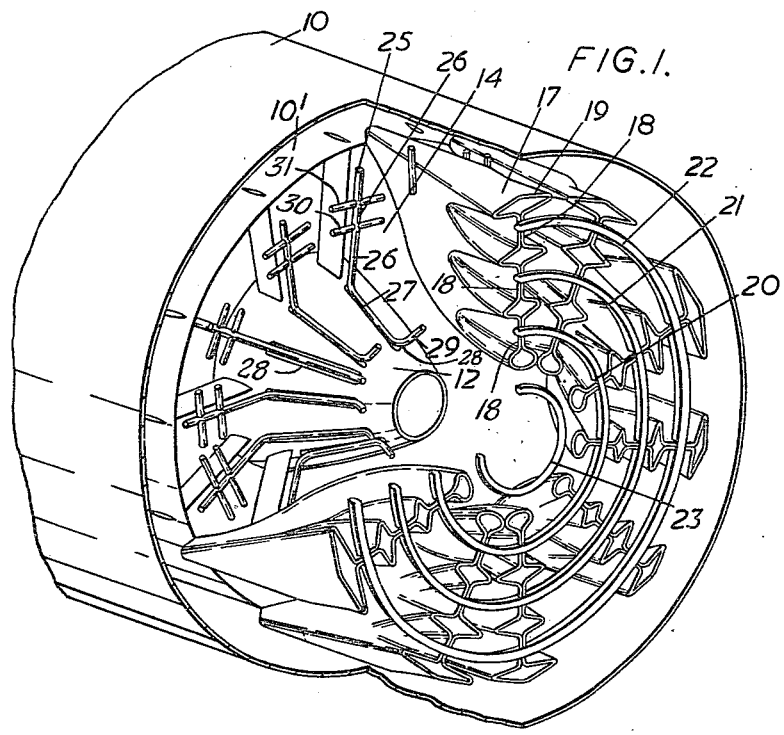

July 10, 1962  A. H. LEFEBVRE ETAL  3,043,101
BY-PASS GAS TURBINE ENGINE EMPLOYING REHEAT COMBUSTION
Filed Feb. 9, 1960  2 Sheets-Sheet 1

Inventors
ARTHUR HENRY LEFEBVRE
ROBERT ARTHUR RICE
JOHN VALENTINE TINDALE
By
Cushman, Darby & Cushman
Attorneys

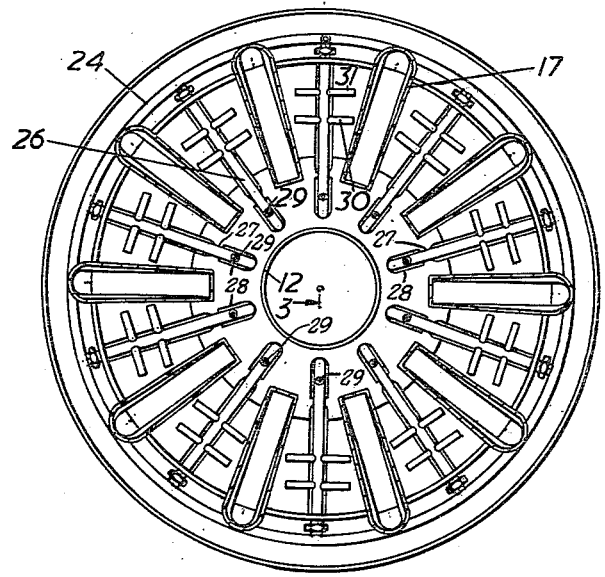
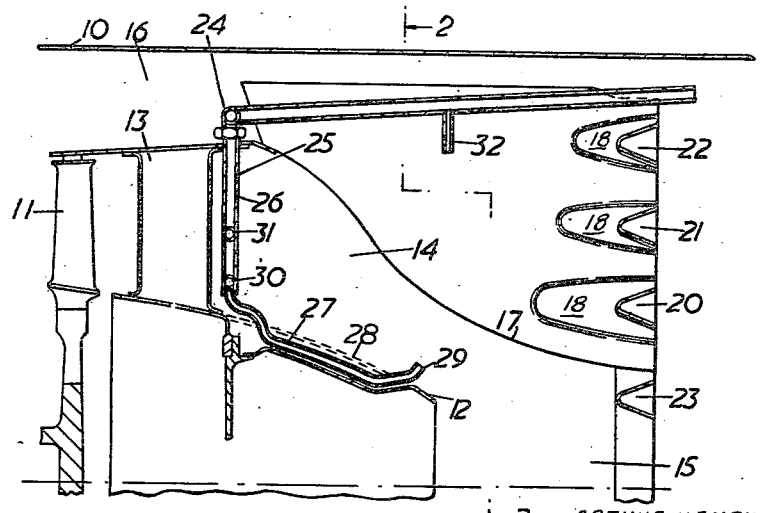
Inventors
ARTHUR HENRY LEFEBVRE
ROBERT ARTHUR RICE
JOHN VALENTINE TINDALE
By
Cushman, Darby & Cushman
Attorneys

United States Patent Office 3,043,101
Patented July 10, 1962

3,043,101
BY-PASS GAS TURBINE ENGINE EMPLOYING REHEAT COMBUSTION
Arthur Henry Lefebvre, Mackworth, Derby, Robert A. Rice, Stretton, Burton-upon-Trent, and John V. Tindale, Alvaston, England, assignors to Rolls-Royce Limited, Derby, England
Filed Feb. 9, 1960, Ser. No. 7,677
Claims priority, application Great Britain Mar. 13, 1959
2 Claims. (Cl. 60—35.6)

This invention relates to a by-pass engine, that is to say a gas-turbine jet-reaction engine of the kind which comprises a gas conduit whose downstream end constitutes the jet pipe of the engine: compressor means, combustion apparatus and turbine means arranged in flow series in said conduit; and a by-pass passage having an inlet communicating with the said conduit on the upstream side of the combustion apparatus and being arranged to receive a part of the compressor output, the by-passage having an outlet downstream of the turbine means, whereby the said part of the compressor output flows through the by-pass passage so as to by-pass the combustion apparatus and turbine means.

Thus a by-pass engine may, for instance, comprise a low pressure compressor part of the output of which is fed into a high pressure compressor and thence through combustion chambers and turbines into the jet pipe. Another part of the output of the low pressure compressor is fed into the by-pass passage which, in known arrangements, runs concentrically with the high pressure compressor, combustion chambers and jet pipe but is separated from these parts by a wall.

If it is desired to provide a by-pass engine with reheat combustion equipment, it is undesirable to locate the equipment in the by-pass passage since it would be difficult to vaporize the reheat fuel in the cold by-pass air. Indeed the injection of reheat fuel into the by-pass air would probably result in the formation of pools of fuel with a consequent severe risk of explosion.

It would be possible in a by-pass engine to provide means for mixing the by-pass air with the turbine exhaust gases in a mixing area disposed within the jet pipe and to provide reheat combustion equipment arranged downstream of the mixing area. The arrangement could be that said reheat combustion equipment comprises combustion stabilizing means, constituted by annular gutters, and fuel injection means disposed upstream of the gutters, the fuel injection means being arranged to inject fuel into the gas stream so as to be carried thereby to the said gutters.

We have found, however, that such an arrangement requires the use of a long jet pipe. This is because the said gutters must be sited at a sufficient distance downstream of the upstream end of the mixing area to ensure that the cold by-pass air and the hot exhaust gases are mixed sufficiently for stable and uniform burning of the reheat fuel. Were the gutters not correctly sited, alternate hot and cold patches would be formed on the gutters, and combustion performance would therefore, be impaired.

According therefore to the present invention there is provided a by-pass gas-turbine jet-reaction engine in which means are provided for mixing the by-pass air with the turbine exhaust gases in a mixing area disposed within the jet pipe, reheat combustion equipment being mounted in area.

The reheat combustion equipment will thus be shielded from the cold by-pass air so that it is unnecessary to provide an unduly long jet pipe.

Preferably the reheat combustion equipment is disposed immediately upstream of the mixing area, the by-pass air being arranged to participate in the recirculation and flame propagation zone immediately downstream of the reheat combustion equipment.

The means for mixing the by-pass air with the turbine exhaust gases may comprise duct means whose upstream end communicates with the by-pass passage of the engine and whose downstream end extends into the said exhaust gas path, the reheat combustion equipment comprising combustion stabilizing means, carried by the duct means, and fuel injection means, arranged upstream of the combustion stabilizing means.

Thus the duct means may comprise a plurality of angularly spaced apart ducts each of which extends radially across the exhaust gas path, the downstream ends of the ducts having portions which are closed to the flow of by-pass air and which carry the said combustion stabilizing means.

The ducts may, for example, comprise hollow struts whose axial cross-section increases in a downstream direction, the downstream end of each duct having radially spaced portions which are pinched in to prevent the flow therethrough of by-pass air, and to carry the combustion stabilizing means.

The combustion stabilizing means preferably comprise a plurality of concentric annular gutters.

The fuel injection means preferably comprises an annular fuel supply manifold disposed in the by-pass passage so as to be cooled by the by-pass air, there being provided angularly spaced apart stub pipes communicating with said fuel supply manifold and extending radially into the exhaust gas path, said stub pipes being provided with fuel injection nozzles which are arranged to inject fuel into the exhaust gases so as to be carried thereby to the combustion stabilizing means.

The siting of the fuel supply manifold in the by-pass passage assists in suppressing fuel boiling within the manifold which would be liable to occur if the manifold were exposed to the hot exhaust gases.

A hollow frusto-conical diffuser may be mounted in the jet pipe immediately downstream of the turbine of the engine, the diffuser and jet pipe defining between them an annular exhaust gas path which merges to one of circular section, the downstream ends of the stub pipes being disposed radially outwardly of the small diameter end of said diffuser so as to ensure that the flame from the reheat combustion does not burn in or adjacent to said small diameter end.

The invention is illustrated, merely by way of example, in the accompanying drawings in which:

FIGURE 1 is a broken away perspective view of part of a gas-turbine jet-reaction engine according to the present invention, and FIGURES 2 and 3 are sections through the gas-turbine engine of FIGURE 1 taken respectively on the line 2—2 of FIGURE 3 and 3—3 of FIGURE 2.

Referring to the drawings, a by-pass, gas-turbine, jet-reaction engine for an aircraft comprises an engine casing 10 whose downstream end constitutes a jet pipe.

Within the engine casing 10 is an inner casing 10' in which there are arranged in flow series low and high pressure compressors (not shown), combustion chambers (not shown) and a turbine 11. A hollow frusto-conical diffuser 12 is mounted in the casing 10' by means of struts 13, the diffuser 12 being arranged immediately downstream of the turbine 11. The diffuser 12 and casing 10' thus define between them an annular turbine exhaust gas path 14 which merges into an exhaust gas path 15 of circular section.

An annular by-pass passage 16 within the casing 10 is adapted to receive a supply of by-pass air which has been compressed by the low pressure compressor, said supply of by-pass air by-passing the high pressure compressor, combustion chambers, and turbine 11.

A plurality of hollow struts 17, spaced apart from each other by equal angular intervals, extend radially across the turbine exhaust gas path 14, 15. The upstream ends of the struts 17 communicate with the by-pass passage 16.

The axial cross-section of each of the struts 17 increases in a downstream direction, the downstream end of each strut having three radially spaced portions 18 which are pinched in to prevent the flow therethrough of by-pass air. As a result of such pinching in of the portions 18, each strut 17 has four radially spaced nozzle portions 19 which are diamond-shaped in cross section.

Three concentric, annular, V-section combustion stabilization gutters 20—22 are carried by the pinched-in portions 18, whilst a fourth such gutter 23 is carried inwardly of the hollow struts 17. The gutters 20—23 are therefore disposed in the path of the hot exhaust gases but are sheltered from the cold by-pass air, the said gutters being sited immediately upstream of the area in which the by-pass air and exhaust gases are intermixed.

Mounted in the by-pass passage 16, so as to be cooled by the by-pass air, is an annular fuel supply manifold 24 with which communicate a plurality of angularly spaced apart stub pipes 25 which are arranged upstream of the gutters 20—23. Each stub pipe 25 has a radially extending portion 26, a portion 27 which is housed within an axially extending recess 28 in the diffuser 12, and a radially outwardly directed end portion 29.

The end portion 29 of each stub pipe 25 is closed and provided with a small hole for the injection of fuel into the exhaust gases flowing through the path 14, 15. The fuel so injected from the portion 29 is carried by the exhaust gas to the gutter 23 where it is burnt in the recirculation zone immediately downstream thereof, the disposition of the downstream end of the portion 29 being such that the fuel injected therefrom is not burnt in or adjacent the downstream or small diameter end of the diffuser 12.

The portion 26 of each stub pipe 25 carries a pair of radially spaced cross pipes 30, 31. The pipes 30, 31 are provided with holes (not shown) through which fuel, which passes into the pipes 30, 31 from the pipe 25, may be injected into the turbine exhaust gases so as to be carried to the gutters 20, 21 respectively. Stub pipes 32, receiving a fuel supply from the manifold 24 and having holes (not shown) therein are provided for the injection into the exhaust gases of the fuel to be burnt at the outer gutter 22.

The construction shown in the drawings has a number of advantages. Thus it is desirable in a reheat system to arrange that the combustion stabilization gutters are supported by structure which offers the minimum blockage to gas flow and which does not itself act as an additional combustion stabilization means. The support of the gutters 20—23 from the struts 17 enables this desideratum to be achieved.

Again, the diamond-shaped cross section of the nozzle portions 19 is such that the surface area of the boundary between the cold by-pass air and the hot exhaust gases is large, whereby mixing of the gases is promoted. The cold by-pass air strikes the recirculation zones immediately downstream of the gutters 20—23 and it can be arranged that the mixing pattern is such as to obtain a predetermined air/fuel ratio.

It will be appreciated that since the gutters 20—23 are disposed upstream of the mixing area and are sheltered from the cold by-pass air, it is unnecessary to provide an unduly long jet pipe. At the same time all the fuel is injected into the hot zone, whereby the formation of pools of fuel, which would present a severe risk of explosion, is avoided.

The injection of the fuel takes place through stub pipes 25, the manifold 24, being arranged in the path of the cold by-pass air whereby over heating and boiling of the fuel, which would occur if the manifold was exposed to the hot exhaust gases, is avoided. The large number of stub pipes 25 employed improves distribution of the flame on the outer gutter 22.

We claim:

1. In a by-pass gas turbine jet reaction engine having a by-pass passage for flow of by-pass air and a jet pipe for flow and discharge of turbine exhaust gases, the improvement comprising: duct means having an upstream end communicating with the by-pass passage and a downstream end extending into the flow of turbine exhaust gases, the discharge end of said duct means having radially spaced discharge outlets separated by a portion closed to flow of by-pass air, the radially spaced discharge outlets discharging by-pass air from the duct means in streams radially separated by said portion within the flow of turbine exhaust gases so that by-pass air and turbine exhaust gases are intimately mixed together; fuel injection means positioned in the flow of turbine exhaust gases in said jet pipe upstream relative to the discharge outlets of said duct means and arranged to inject reheat fuel solely into turbine exhaust gases; and combustion stabilizing means mounted on the closed portion of said duct means, said combustion stabilizing means being arranged to be substantially wholly exposed to the flow of turbine exhaust gases immediately forward of mixture of turbine exhaust gases with by-pass air.

2. In a by-pass gas turbine jet reaction engine having a by-pass passage for flow of by-pass air and a jet pipe for flow and discharge of turbine exhaust gases, the improvement comprising: a plurality of angularly spaced apart ducts having upstream ends communicating with the by-pass passage and downstream ends extending into the flow of turbine exhaust gases, the discharge end of each of said angularly spaced ducts having radially spaced discharge outlets separated by radially spaced portions closed to flow of by-pass air, the radially spaced discharge outlets of each of said ducts discharging by-pass air therefrom in streams radially separated by said spaced closed portions and within the flow of turbine exhaust gases so that by-pass air and turbine exhaust gases are intimately mixed together; fuel injection means positioned in the flow of turbine exhaust gases in said jet pipe upstream relative to the discharge outlets of said ducts and arranged to inject reheat fuel solely into turbine exhaust gases; and at least one annular combustion stabilizing gutter mounted on corresponding closed portions of said angularly spaced apart ducts, said annular combustion stabilizing gutter being arranged to be substantially wholly exposed to the flow of turbine exhaust gases immediately forward of mixture of the turbine exhaust gases with by-pass air.

References Cited in the file of this patent

UNITED STATES PATENTS

| | | |
|---|---|---|
| 2,308,059 | Decker | Jan. 12, 1943 |
| 2,501,633 | Price | Mar. 21, 1950 |
| 2,523,654 | Goddard | Sept. 26, 1950 |
| 2,588,532 | Johnson | Mar. 11, 1952 |
| 2,921,434 | Spadaro et al. | Jan. 19, 1960 |
| 2,929,203 | Henning et al. | Mar. 22, 1960 |
| 2,934,895 | Gregory et al. | May 3, 1960 |
| 2,937,491 | Howell | May 24, 1960 |
| (U.S. copy of British Patent 749,009) | | |
| 2,978,865 | Pierce | Apr. 11, 1961 |
| 2,979,900 | Hopper | Apr. 18, 1961 |

FOREIGN PATENTS

| | | |
|---|---|---|
| 749,009 | Great Britain | Apr. 24, 1953 |